(12) United States Patent
Wu et al.

(10) Patent No.: US 6,348,515 B1
(45) Date of Patent: Feb. 19, 2002

(54) BLOWING AGENT BLENDS

(75) Inventors: Jinhuang Wu, Lower Providence; Douglas R. Dillon, West Norriton, both of PA (US)

(73) Assignee: Atofina Chemicals, Inc., Philadelphia, PA (US)

( * ) Notice: Subject to any disclaimer, the term of this patent is extended or adjusted under 35 U.S.C. 154(b) by 0 days.

(21) Appl. No.: 09/656,539

(22) Filed: Sep. 6, 2000

(51) Int. Cl.$^7$ ................................................ C08G 18/14
(52) U.S. Cl. ........................... 521/170; 252/67; 252/69; 510/408; 510/412; 521/131; 521/155; 521/170; 521/174
(58) Field of Search ...................... 252/67, 69; 510/408, 510/412; 521/131, 155, 170, 174

(56) References Cited

U.S. PATENT DOCUMENTS 5,439,947 A      8/1995  Bartlett et al. .............. 521/131
5,444,101 A   *  8/1995  De Vos et al. .............. 521/131
5,700,843 A   * 12/1997  Valoopi ...................... 521/131

FOREIGN PATENT DOCUMENTS

JP        08/143696        6/1996

OTHER PUBLICATIONS

"Hydrocarbon Blown RIgid Polyurethane Foam for the Boardstock Industry—A Novel Approach" by R. E. Berrier et al, Sep./1998.

Research Disclosure 38832, Aug./1996.

* cited by examiner

Primary Examiner—John M. Cooney, Jr.
(74) Attorney, Agent, or Firm—William D. Mitchell

(57) ABSTRACT

Foam blowing agents blends of HFC-134a and a pentane selected from n-pentane, i-pentane and i-pentane/cyclopentane are provided, as are polyol premixes and polyurethane foam compositions containing such blends.

9 Claims, No Drawings

BLOWING AGENT BLENDS

BACKGROUND OF THE INVENTION

This invention relates to foam blowing agent blends of (a) 1,1,1,2-tetrafluoroethane ("HFC-134a" or "134a") with (b) n-pentane (n-C5), i-pentane (i-C5) or a mixture of i-pentane and cyclopentane (i-C5/c-C5) and to polyol premixes and polyurethane foam compositions containing such blends.

Until now, the leading polyurethane foam blowing agent has been 1,1-dichloro-1-fluoroethane ("141b"), in order to meet the market place requirements for energy, fire performance and cost. At the same time, however, 141b has a high ozone depletion potential ("ODP") of about 0.1. Thus, many foam manufacturers are now investigating the zero ODP pentanes as candidates to replace 141b, as noted for example in an article on "Hydrocarbon Blown Rigid Polyurethane Foam for the Boardstock Industry—A novel Approach" by R. E. Berrier et al which appeared in Polyurethanes Expo '98, Sep. 17–20, 1998. They too, however, have property shortcomings for use in foam, such as high k-factor performance in foam (thus giving foams with poor thermal insulating properties). They are also flammable.

HFC-134a has also been disclosed, as in U.S. Pat. No. 5,439,947, for use as a foam blowing agent. When used alone, it has certain disadvantages such as a high global warming potential ("GWP") of about 1300 and limited solubility in foam formulation components such as polyols and polymeric MDI (methane diphenyl diisocyanate).

It would therefore be useful to provide the industry with an alternative foam blowing agent which overcomes the deficiencies of 134a or the pentanes alone in terms of properties such as ODP, GWP, and k-factor performance.

BRIEF SUMMARY OF THE INVENTION

Foam blowing agent compositions are provided, which compositions comprise (a) 134a and (b) a pentane selected from the group consisting of n-C5, i-C5 and i-C5/c-C5 (preferably as an equimolar mixture of i-C5 and c-C5), as well as foam premix compositions, which premix compositions comprise a polyol and the foregoing blowing agent blend, and polyurethane foam compositions, which foam compositions comprise an A-side containing an isocyanate and all or a portion of the foregoing blowing agent blend and a B-side containing a polyol and all or a portion of the foregoing blowing agent blend.

DETAILED DESCRIPTION

It has now been found that the foregoing blends of pentanes with HFC-134a overcome deficiencies associated with the use of either alone. Most important, as shown below, the addition of relatively small amounts of 134a has been found to lower the k-factor (and thus enhance the thermal insulating properties) of foams made with such blends relative to the use of the pentanes alone, especially at low temperatures, while still taking advantage of the low GWP properties of the pentanes (for example, cyclopentane has a GWP of 11 versus a GWP of 1300 for 134a alone). Other advantages include improved solubility in raw materials such as polyester polyols (especially for n-pentane and i-pentane) and less volatile organic compound ("VOC") content than pure hydrocarbon since HFC-134a is not a VOC.

The unexpected improvement shown in the following examples in low temperature (0° C.) k-factor performance is particularly significant for many foam applications such as for refrigerators, freezers and cold storage facilities.

The preferred amount of 134a in the blends varies with the particular pentane or pentane mixture, as shown by the examples below, but is generally in the 5–30 mole % range.

In the premix compositions, the blowing agent blend is typically present in a concentration range of about 2–60 weight % (preferably 5–40 weight %), based on the weight of the polyol.

In the polyurethane foam compositions, the effective concentrations of the blends are typically about 0.1–25 weight % (preferably 0.5–15%) based on the weight of the total polyurethane foam formulation.

The pentane component and/or the 134a component of the blend can be added to the A-side or the B-side or a portion thereof distributed in each side. It is also possible to add the blowing agent composition as a third stream to the foam machine, wholly apart from the A- or B-side.

The other components of the premix and foam formulations may be those which are conventionally used, which components and their proportions are well known to those skilled in the art. For example, catalysts, fire retardants and surfactants are typical components of the B-side.

The practice of the invention is illustrated in more detail in the following non-limiting examples. The formulations used (all having an Iso Index of 300) each contained 170.51 parts M-489, a polymeric methane diphenyl diisocyanate available from Bayer Corporation; 100 parts PS2352, a polyester polyol having a hydroxyl number of 230–250 available from the Stepan Company; 0.19 part PC-5 and 0.33 part PC-46, which are, respectively, pentamethyldiethylenetriamine and potassium acetate in ethylene glycol, catalysts available from Air Products; 2.98 parts K-15, potassium octoate in dipropylene glycol, a catalyst available from Air Products; 2 parts B-8462, a polysiloxane-polyether copolymer surfactant available from Goldschmidt Chemical Corporation; 10 parts A-B-80, a tris(1-chloro-2-propyl) phosphate fire retardant available from Albright & Wilson Americas, Inc; and about 24–26 parts blowing agents, the exact amounts of which are more particularly set forth below; all parts are by weight.

The A-side component (isocyanate) was maintained at about 75–80° F. (about 24–27° C.). B-side premix components, containing polyol, surfactant, fire retardant, catalyst and blowing agent, were mixed and maintained at about 75–80° F. (about 24–27° C.). The blowing agent used is set forth in Tables I and II below.

TABLE I

Parts of Blowing Agent in Comparative Examples

| i-C5: | 24.91 | 12.46 | — | — | — |
| c-C5: | — | 12.11 | 24.22 | — | 21.8 |
| n-C5: | — | — | — | 24.91 | — |
| HFC-134a | — | — | — | — | 3.53* |

TABLE II

Parts of Blowing Agent in Invention
Examples with 10 Mole %* 134a in Blowing Agent Blend

| i-C5: | 22.42 | 11.21 | — |
| c-C5: | — | 10.90 | — |
| n-C5: | — | — | 22.42 |
| HFC-134a: | 3.53 | 3.53 | 3.53 |

*For examples with 20 mole % of HFC-134a, the proportional amount of 134a relative to the pentane content was varied In making the foam, the A and B sides were mixed at pressures above 2000 psi and dispensed into a mold preheated to 150° F. (about 66° C.). The mold was kept closed for a few minutes before releasing the foam. For free rise foam, a mixture of the A and B sides was dispensed into an open container and the foams were allowed to expand.

ASTM procedures were followed to measure (initial) k-factors (ASTM C518) of the resultant foams at ambient temperature (24° C.) and at 0° C. The results of the molded foam are shown in Tables III and IV:

TABLE III

K-factors (in BTU · in/ft² · hr · ° F.) at 24° C.
(% s in blends are in mole %)

| | |
|---|---|
| For 100% n-C5: | 0.152 |
| For 10%/90% blend of 134a/n-C5: | 0.151 |
| For 20%/80% blend of 134a/n-C5: | 0.147 |
| For 100% i-C5: | 0.154 |
| For 10%/90% blend of 134a/i-C5: | 0.157 |
| For 20%/80% blend of 134a/i-C5: | 0.150 |
| For 100% c-C5: | 0.140 |
| For 10%/90% blend of 134a/c-C5: | 0.140 |
| For 20%/80% blend of 134a/c-C5: | 0.142 |
| For 100% of a 50/50 c-C5/i-C5 blend: | 0.154 |
| For 10%/90% blend of 134a with the 50/50 c-C5/i-C5 blend: | 0.148 |
| For 20%/80% blend of 134a with the 50/50 c-C5/i-C5 blend: | 0.138 |

TABLE IV

K-factors (in BTU · in/ft² · hr · ° F.) at 0° C.
(% s in blends are in mole %)

| | |
|---|---|
| For 100% n-C5: | 0.184 |
| For 10%/90% blend of 134a/n-C5: | 0.172 |
| For 20%/80% blend of 134a/n-C5: | 0.159 |
| For 100% i-C5: | 0.179 |
| For 10%/90% blend of 134a/i-C5: | 0.171 |
| For 20%/80% blend of 134a/i-C5: | 0.149 |
| For 100% c-C5: | 0.142 |
| For 10%/90% blend of 134a/c-C5: | 0.135 |
| For 20%/80% blend of 134a/c-C5: | 0.131 |

TABLE IV-continued

K-factors (in BTU · in/ft² · hr · ° F.) at 0° C.
(% s in blends are in mole %)

| | |
|---|---|
| of 134a/c-C5: | |
| For 100% of a 50/50 c-C5/i-C5 blend: | 0.185 |
| For 10%/90% blend of 134a with the 50/50 c-C5/i-C5 blend: | 0.163 |
| For 20%/80% blend of 134a with the 50/50 c-C5/i-C5 blend: | 0.144 |

For free rise foam, improvement of low temperature (0° C.) initial k-factor over pure pentane was observed with all blowing agent blends using 20 mole % 134a.

We claim:

1. A foam blowing agent composition comprising 1,1,1,2-tetrafluoroethane, i-pentane and cyclopentane.

2. The composition of claim 1 wherein the i-pentane and cyclopentane are present in equimolar amounts.

3. A foam premix composition comprising a polyol and the foam blowing agent composition of claim 1.

4. A polyurethane foam composition comprising an isocyanate, a polyol and the foam blowing agent composition of claim 1, said foam composition having (a) an A-side which contains the isocyanate and, optionally, a portion of the foam blowing agent composition and (b) a B-side which contains the polyol and the balance of the foam blowing agent composition.

5. A foam blowing agent composition comprising (a) about 5 to 30 mole % of 1,1,1,2-tetrafluoroethane and (b) about 95 to 70 mole % of a pentane selected from the group consisting of n-pentane and an i-pentane/cyclopentane blend.

6. The composition of claim 5 wherein the pentane is an equimolar mixture of i-pentane and cyclopentane.

7. The composition of claim 5 wherein the pentane is n-pentane.

8. A foam premix composition comprising a polyol and the foam blowing agent composition of claim 5.

9. A polyurethane foam composition comprising an isocyanate, a polyol and the foam blowing agent composition of claim 5, said foam composition having (a) an A-side which contains the isocyanate and, optionally, a portion of the foam blowing agent composition and (b) a B-side which contains the polyol and the balance of the foam blowing agent composition.

* * * * *